(12) United States Patent
Watanabe

(10) Patent No.: US 10,942,425 B2
(45) Date of Patent: Mar. 9, 2021

(54) ACCESSORY DEVICE, CAMERA, AND STORAGE MEDIUM

(71) Applicant: CANON KABUSHIKI KAISHA, Tokyo (JP)

(72) Inventor: Yutaka Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/681,122

(22) Filed: Nov. 12, 2019

(65) Prior Publication Data

US 2020/0081323 A1    Mar. 12, 2020

Related U.S. Application Data

(63) Continuation of application No. PCT/JP2018/020767, filed on May 30, 2018.

(30) Foreign Application Priority Data

May 31, 2017    (JP) .............................. JP2017-108268
May 30, 2018    (JP) .............................. JP2018-102944

(51) Int. Cl.
   *G03B 17/14*    (2006.01)
   *G03B 17/56*    (2006.01)
   *H04N 5/225*    (2006.01)
   *H04N 5/232*    (2006.01)

(52) U.S. Cl.
   CPC ........... *G03B 17/14* (2013.01); *G03B 17/566* (2013.01); *G03B 17/565* (2013.01); *H04N 5/2254* (2013.01); *H04N 5/232* (2013.01)

(58) Field of Classification Search
   None
   See application file for complete search history.

(56) References Cited

U.S. PATENT DOCUMENTS

| 10,057,471 | B2 * | 8/2018 | Komatsu | H04N 5/23209 |
| 10,642,546 | B2 * | 5/2020 | Utsumi | G06F 3/1285 |
| 10,659,671 | B2 * | 5/2020 | Kawada | H04N 5/04 |
| 2013/0004152 | A1 | 1/2013 | Imafuji | |
| 2014/0300768 | A1 | 10/2014 | Imamura | |
| 2020/0081323 | A1 * | 3/2020 | Watanabe | G03B 17/56 |
| 2020/0092461 | A1 * | 3/2020 | Watanabe | H04N 5/2254 |
| 2020/0099850 | A1 * | 3/2020 | Watanabe | H04N 5/232411 |

FOREIGN PATENT DOCUMENTS

| CN | 102890393 A | 1/2013 |
| CN | 203241681 U | 10/2013 |
| JP | S62-178222 A | 8/1987 |
| JP | 2007-148592 A | 6/2007 |

(Continued)

*Primary Examiner* — William B Perkey
(74) *Attorney, Agent, or Firm* — Canon U.S.A., Inc. I.P. Division

(57) ABSTRACT

An image pickup device includes a notification channel and a data communication channel for communication with an accessory device, the notification channel being used for signal transfer between the image pickup device and the accessory device, the data communication channel being used for data communication between the image pickup device and the accessory device. The image pickup device starts the communication with the accessory device when a voltage level of the notification channel takes a predetermined level.

10 Claims, 8 Drawing Sheets

(56) References Cited

FOREIGN PATENT DOCUMENTS

| | | |
|---|---|---|
| JP | 2012-037692 A | 2/2012 |
| JP | 2013-190812 A | 9/2013 |
| JP | 2016-106277 A | 6/2016 |
| JP | 2017-090726 A | 5/2017 |
| WO | 2017/068912 A1 | 4/2017 |

* cited by examiner

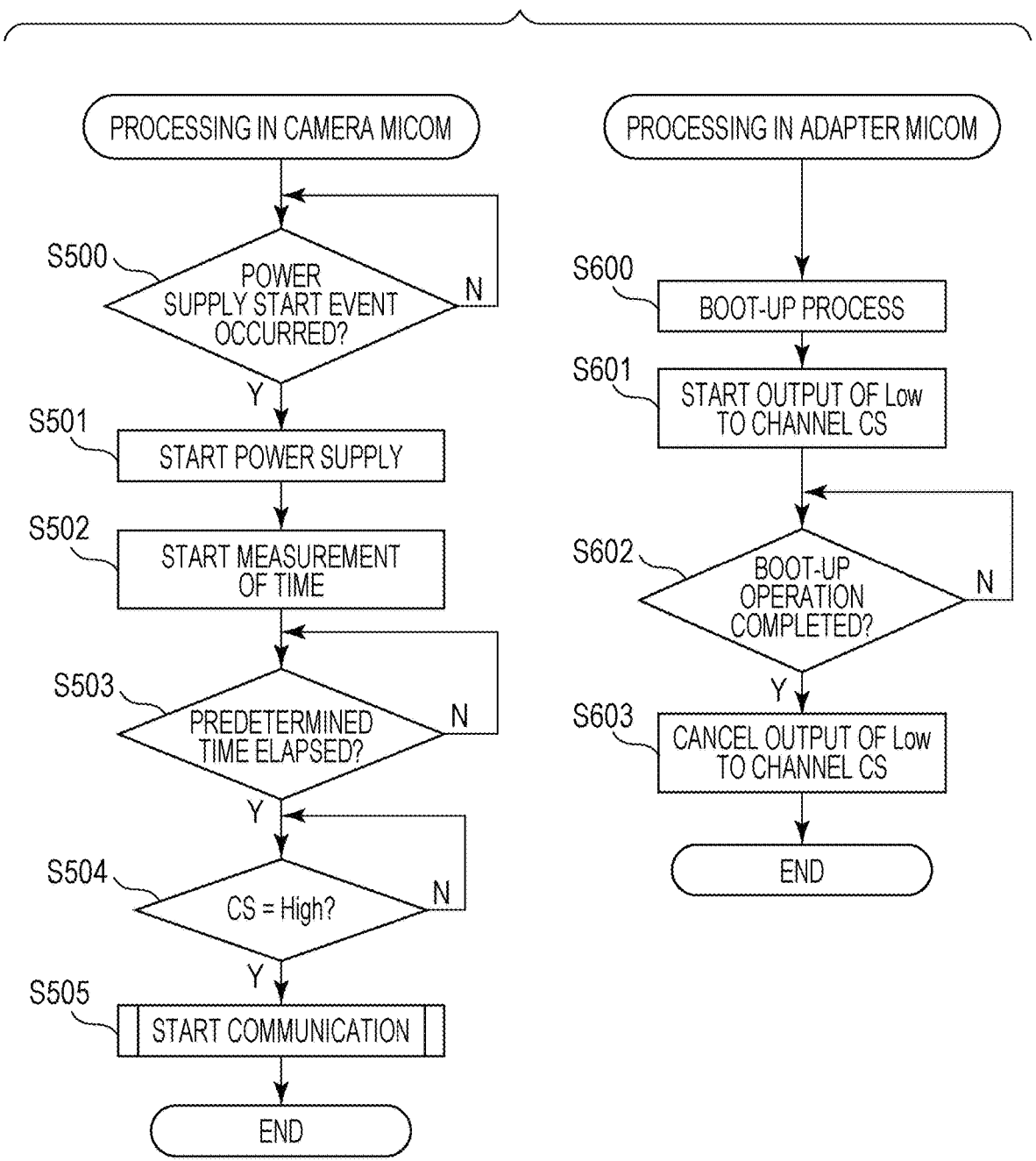

ACCESSORY DEVICE, CAMERA, AND STORAGE MEDIUM

CROSS-REFERENCE TO RELATED APPLICATIONS

This application is a Continuation of International Patent Application No. PCT/JP2018/020767, filed May 30, 2018, which claims the benefit of Japanese Patent Application No. 2017-108268, filed May 31, 2017, and Japanese Patent Application No. 2018-102944, filed May 30, 2018, all of which are hereby incorporated by reference herein in their entirety.

TECHNICAL FIELD

The present invention relates to a camera and an accessory device, such as an intermediate adapter or an interchangeable lens, which can communicate with each other.

BACKGROUND ART

As an example of interchangeable-lens camera systems, there is known a system in which a camera, i.e., a camera main unit, performs an image pickup process and lens control, and in which an interchangeable lens serving as a first accessory device performs lens driving in accordance with a control command from the camera main unit. In such a camera system, transfer of the control command from the camera main unit to the interchangeable lens and transfer of lens information from the interchangeable lens to the camera main unit are performed via a communication channel for mutual exchange of information.

There is also known a camera system in which an intermediate adapter serving as a second accessory device, e.g., a converter for changing the focal length of the interchangeable lens, can be connected between the camera main unit and the interchangeable lens in order to extend the photographing function. In such a camera system, communication between the camera main unit and the intermediate adapter is often needed in addition to communication between the camera main unit and the interchangeable lens.

Patent Literature (PTL) 1 discloses a communication control method in accordance with the I2C (Inter-Integrated Circuit) communication protocol. In I2C communication, a plurality of communication slaves is connected to a communication master, and communication is performed between the communication master and the particular communication slave designated by the communication master.

In the I2C communication, the communication master transmits address information designating the particular slave to all the communication slaves. Each of the communication slaves holds specific address information assigned to itself, and the communication slave holding the specific address information corresponding to the address information transmitted from the communication master becomes the communication partner with the communication master.

CITATION LIST

Patent Literature

PTL 1 Japanese Patent Laid-Open No. 2007-148592

PTL 1 does not disclose anything about a control sequence at the start of communication in a communication system that is constituted by a communication master and communication slaves. When the plurality of communication slaves is connected to the communication master, a boot-up operation for starting the communication is performed in each of the communication slaves prior to the start of the communication.

Depending on, for example, the performance of a microcomputer incorporated in the communication slave, a period until the start of the boot-up operation and a time required for the boot-up operation itself are different for each communication slave. Accordingly, when the communication master determines, from the end of the boot-up operation in the particular communication slave, that the boot-up operation for the communication system is completed, there may generate a situation that, in some communication slave, the boot-up operation is actually not yet completed.

If the communication master starts the communication under the above-described situation, an error generates in the communication system, and the boot-up operation is repeatedly executed. This may cause a possibility that a long time is taken for boot-up of the communication system.

SUMMARY OF THE INVENTION

An object of the present invention is to realize a camera and an accessory device which can execute in a short time a boot-up operation for an image pickup system including the camera, i.e., a main unit of the camera, and all of multiple accessory devices mounted to the camera.

The present invention provides a camera to which a plurality of accessory devices is mountable, the camera including a camera control unit controlling communication that is performed between the camera and all the accessory devices mounted to the camera via channels, the channels including a notification channel used for signal transfer and a data communication channel used for data communication, and a power supply unit supplying electric power to all the accessory devices mounted to the camera, wherein all the accessory devices mounted to the camera and the camera are each able to set the notification channel to first setting and second setting, wherein a voltage level of the notification channel takes a first level corresponding to the first setting when any of all the accessory devices mounted to the camera and the camera sets the notification channel to the first setting, and a second level corresponding to the second setting and being different from the first level when each of all the accessory devices mounted to the camera and the camera sets the notification channel to the second setting, wherein each of the accessory devices mounted to the camera sets the notification channel to the first setting in response to start of power supply from the power supply unit such that the data communication from the camera via the data communication channel is not started, and wherein the camera control unit starts the data communication via the data communication channel with the accessory devices mounted to the camera on condition that the voltage level of the notification channel takes the second level in a state in which the camera control unit sets the notification channel to the second setting.

Further features of the present invention will become apparent from the following description of exemplary embodiments with reference to the attached drawings.

BRIEF DESCRIPTION OF DRAWINGS

FIG. 5 is a flowchart representing a control flow in the boot-up operation.

DESCRIPTION OF EMBODIMENTS

A communication control method for accessory devices, such as an interchangeable lens and an intermediate adapter, and a camera according to the present invention will be described in detail below with reference to the accompanying drawings.

Figure 1:
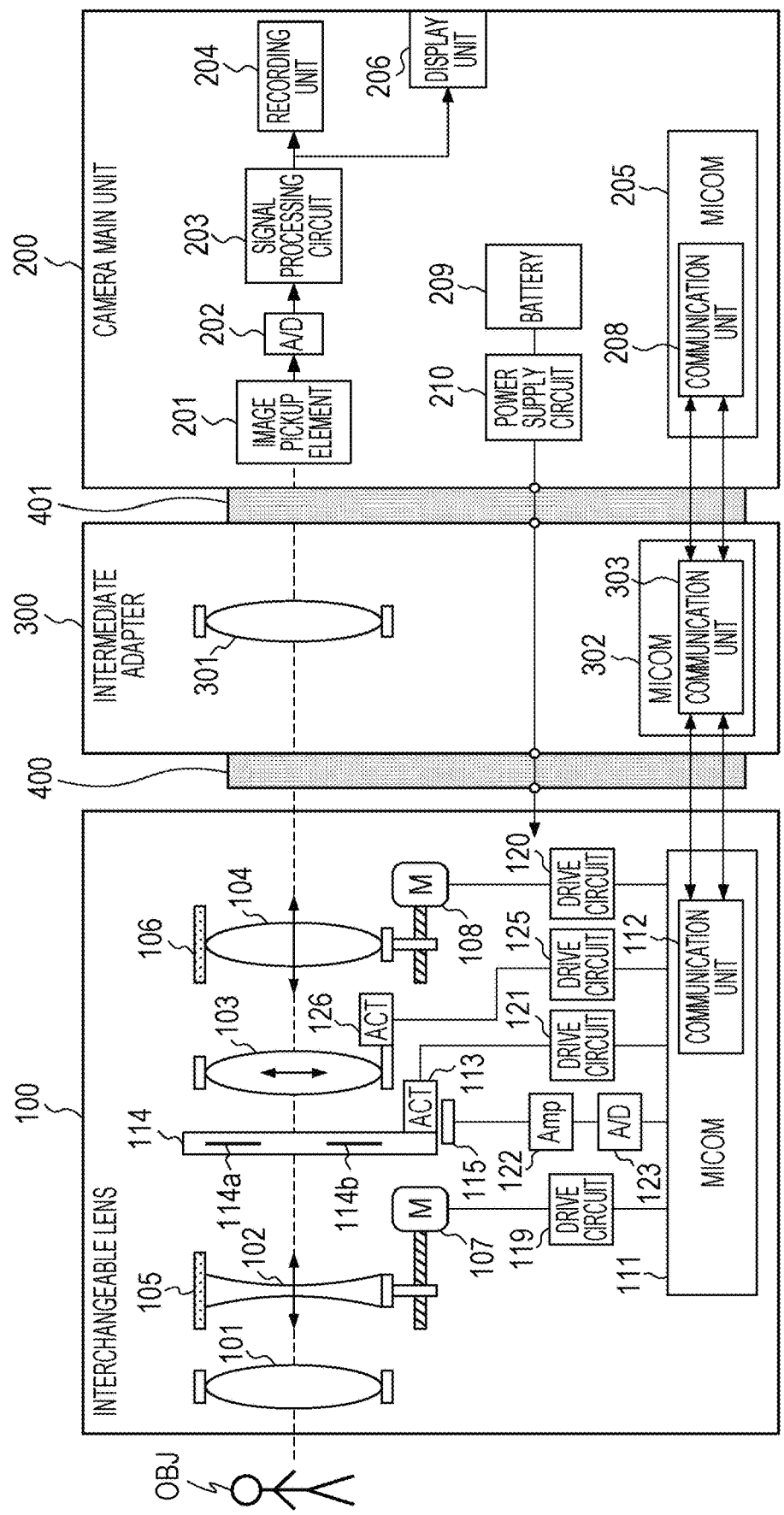
FIG. 1 is a block diagram illustrating a configuration of a camera system, which includes a camera and an accessory device, according to the present invention.

The present invention relates to a boot-up sequence at the start of communication in a camera system including a camera main unit and a plurality of accessory devices. The present invention can be applied to, for example, a camera system in which, as illustrated in FIG. 1, an intermediate adaptor 300 is mounted between a camera main unit 200 and an interchangeable lens 100. Although the following embodiment is described in connection with an example in which one intermediate adapter 300 is mounted between the camera main unit 200 and the interchangeable lens 100, a plurality of intermediate adapters may be mounted between the camera main unit 200 and the interchangeable lens 100.

In the present invention, "the accessory device mounted to the camera main unit 200" includes not only the intermediate adaptor 300 that is directly mounted to the camera main unit 200, but also the interchangeable lens 100 that is mounted to the camera main unit 200 with the intermediate adaptor 300 interposed therebetween.

Prior to the start of communication in the camera system, preparation operations (hereinafter also called boot-up operations) for starting the communication are performed in individual components constituting the camera system. The camera main unit 200 operating as a communication master needs to start the communication after confirming that the boot-up operation in each accessory device operating as a communication slave has been completed.

By preparing, for each communication slave, a notification channel for notifying whether the boot-up operation has been completed, the camera main unit 200 can easily confirm whether the boot-up operations in all the accessory devices have been completed. However, increasing the number of notification channels in the camera system is not desired because of increasing not only the size of a connecting portion between the camera main unit and the accessory device, but also the cost.

Taking into consideration the above point, in the present invention, the notification channel is used in common in a communication system without providing a dedicated notification channel for each communication slave.

Explanation of Configuration of Camera System

FIG. 1 illustrates a configuration of an image pickup system (hereinafter called a camera system) including the camera main unit 200, i.e., a camera according to the present invention, the intermediate adapter 300, and the interchangeable lens 100, the latter two being the accessory devices mountable to the camera main unit 200. The camera main unit 200, the interchangeable lens 100, and the intermediate adapter 300 transfer control commands and internal information through individual communication units equipped therein.

First, detailed configurations of the interchangeable lens 100, the intermediate adapter 300, and the camera main unit 200 are described. The intermediate adapter 300 and the camera main unit 200 are mechanically and electrically connected through a mount 401 that is a coupling mechanism. The intermediate adapter 300 is supplied with electric power from the camera main unit 200 through a power supply terminal, which is provided in the mount 401, for control of an adapter microcomputer (hereinafter called an adapter MICOM) 302.

The interchangeable lens 100 and the intermediate adapter 300 are mechanically and electrically connected through a mount 400 that is a coupling mechanism. The interchangeable lens 100 is supplied with electric power from the camera main unit 200 through a not-illustrated power supply terminal provided in the mount 400 and the power supply terminal provided in the mount 401. By using the electric power received from the camera main unit 200, the interchangeable lens 100 operates later-described various actuators and a lens microcomputer (hereinafter called a lens MICOM) 111. Moreover, the interchangeable lens 100, the intermediate adapter 300, and the camera main unit 200 perform mutual communication through communication terminals (illustrated in FIG. 2) provided in the mounts 400 and 401.

Next, the configuration of the interchangeable lens 100 is described. The interchangeable lens 100 includes an image pickup optical system. The image pickup optical system includes a field lens 101, a zoom lens 102 for zooming, a diaphragm unit 114 for adjusting a light quantity, an image stabilizing lens 103, and a focus lens 104 for focus adjustment, which are successively disposed in the mentioned order from the side close to an object OBJ.

The zoom lens 102 and the focus lens 104 are held by lens holding frames 105 and 106, respectively. The lens holding frames 105 and 106 are movably guided by not-illustrated guide shafts in the direction of an optical axis denoted by a dotted line in the drawing, and are driven in the direction of the optical axis by stepping motors 107 and 108, respectively. The stepping motors 107 and 108 move respectively the zoom lens 102 and the focus lens 104 in synchronism with drive pulses.

The image stabilizing lens 103 is movable in a direction perpendicular to the optical axis of the image pickup optical system to reduce an image blur attributable to a hand shake, etc.

The lens MICOM 111 is an accessory control unit for controlling operations of various components in the interchangeable lens 100. The lens MICOM 111 receives a control command, which is transmitted from the camera main unit 200, through a lens communication unit 112, i.e., an accessory communication unit, and accepts a request for transmitting lens data. Moreover, the lens MICOM 111 performs lens control corresponding to the control command and transmits lens data, which corresponds to the transmission request, to the camera main unit 200 through the lens communication unit 112.

In addition, the lens MICOM 111 outputs drive signals to a zoom drive circuit 119 and a focus drive circuit 120 in response to those ones among control commands, which are related to zooming and focusing, thereby driving the stepping motors 107 and 108. As a result, a zoom process of controlling a zoom operation by the zoom lens 102 and an auto-focus process of controlling a focus adjustment operation by the focus lens 104 are performed.

The diaphragm unit 114 includes diaphragm blades 114a and 114b. States of the diaphragm blades 114a and 114b are detected by a Hall element 115, and a detected signal is input to the lens MICOM 111 through an amplifier circuit 122 and an A/D converter circuit 123. The lens MICOM 111 outputs a drive signal to a diaphragm drive circuit 121 in accordance with an input signal from the A/D converter circuit 123, thereby driving a diaphragm actuator 113. As a result, a light quantity adjustment operation by the diaphragm unit 114 is controlled.

Moreover, the lens MICOM 111 drives an image stabilizing actuator 126 through an image stabilizing drive circuit 125 depending on a shake detected by a not-illustrated shake sensor, such as a vibration gyro, which is disposed in the interchangeable lens 100. As a result, an image stabilizing process of controlling a shift operation of the image stabilizing lens 103 is performed.

The configuration of the intermediate adapter 300 is now described. In this embodiment, the intermediate adapter 300 is an extender for extending the focal length of the interchangeable lens 100. The intermediate adapter 300 is not limited to the extender and may be given with various functions. For example, a filter for changing transmittance of light having passed through the interchangeable lens 100 may be incorporated in the intermediate adapter 300. The intermediate adapter 300 may include a plurality of filters having different optical transmittances and may be able to select appropriate one of the filters depending on photographing situations, etc.

The intermediate adapter 300 in this embodiment includes a zoom lens 301 for extending the focal length of the interchangeable lens 100, and the adapter MICOM 302, i.e., an accessory control unit, for controlling operations of various components in the intermediate adapter 300. The adapter MICOM 302 receives a control command, which is transmitted from the camera main unit 200, through an adapter communication unit 303, i.e., an accessory communication unit, and performs adapter control corresponding to the control command. Moreover, the adapter MICOM 302 transmits adapter data, which corresponds to a transmission request from the camera main unit 200, to the camera main unit 200 through the adapter communication unit 303.

Next, the configuration of the camera main unit 200 is described. The camera main unit 200 includes an image pickup element 201 such as a CCD sensor or a CMOS sensor, an A/D converter circuit 202, a signal processing circuit 203, a recording unit 204, a camera microcomputer (hereinafter called a camera MICOM) 205, and a display unit 206.

The image pickup element 201 photo-electrically converts an object image that has been formed by the image pickup optical system in the interchangeable lens 100, and outputs an electrical signal (analog signal). The A/D converter circuit 202 converts the analog signal from the image pickup element 201 to a digital signal. The signal processing circuit 203 performs various types of image processing on the digital signal from the A/D converter circuit 202 and produces a video signal.

Furthermore, the signal processing circuit 203 produces, from the video signal, focus information indicating a contrast state of the object image, i.e., a focus state of the image pickup optical system, and luminance information indicating an exposure state. The signal processing circuit 203 outputs the video signal to the display unit 206, and the display unit 206 displays the video signal as a live view image that is used to check a composition, a focus state, etc.

The camera MICOM 205 serving as a camera control unit controls the camera main unit 200 in response to inputs from camera operating members, such as an image-pickup instruction switch and various setting switches (not illustrated). Furthermore, the camera MICOM 205 transmits a control command, which is related to the zoom operation of the zoom lens 102, to the lens MICOM 111 through a camera communication unit 208 in response to an operation of a not-illustrated zoom switch. In addition, the camera MICOM 205 transmits control commands for the light quantity adjustment operation of the diaphragm unit 114 depending on the luminance information and the focus adjustment operation of the focus lens 104 depending on the focus information to the lens MICOM 111 through the camera communication unit 208.

A power supply unit for supplying electric power to the accessory device is further disposed in the camera main unit 200. In this embodiment, a battery 209, such as a lithium ion battery, is disposed as the power supply unit. A voltage of the battery 209 is converted to a predetermined voltage by a power supply circuit 210, and the predetermined voltage is supplied to the intermediate adaptor 300 and the interchangeable lens through the power supply terminals.

Explanation of Configuration of Communication Circuits

Figure 2:
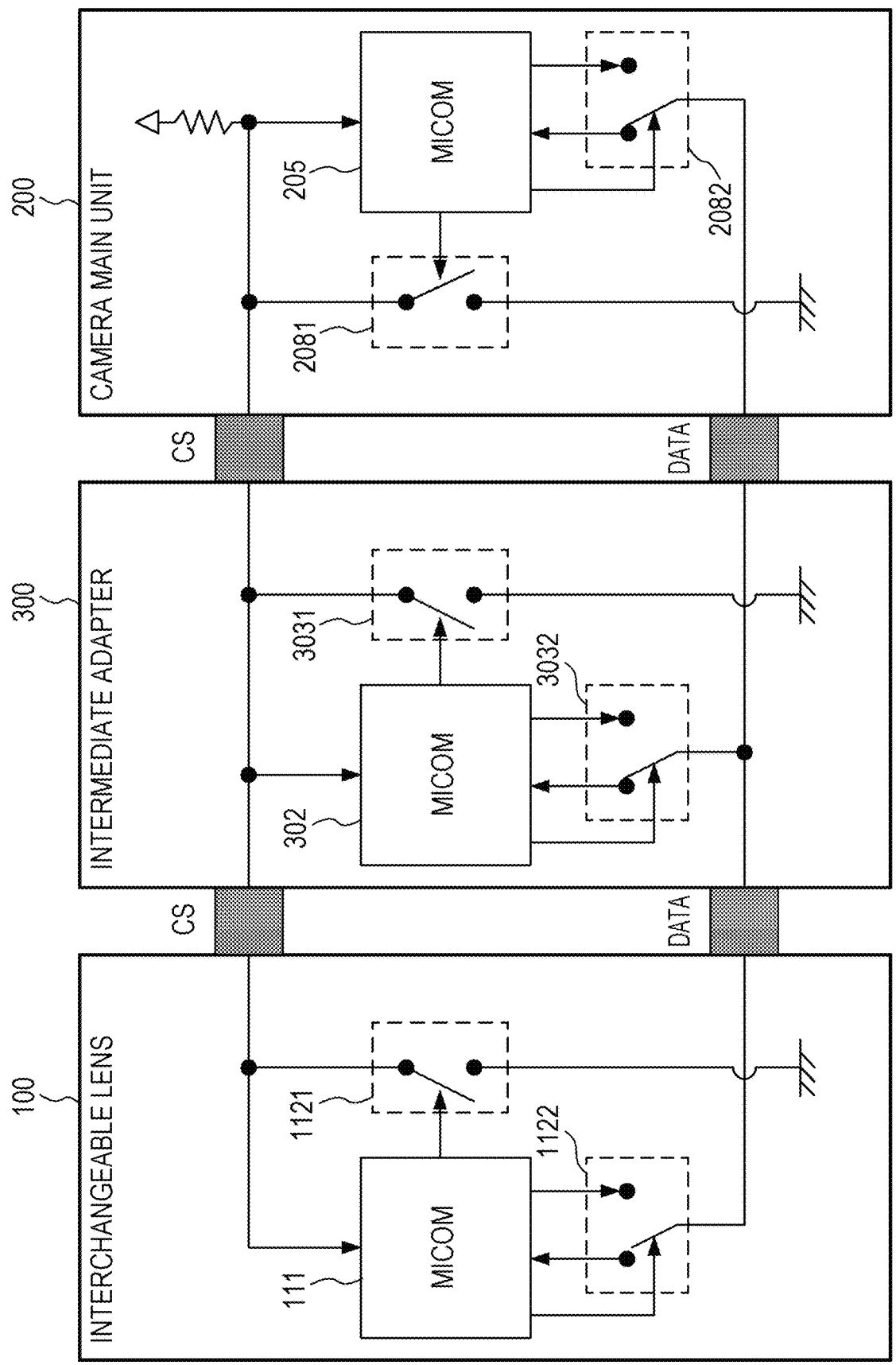
FIG. 2 is a schematic view illustrating communication circuits in the camera system according to the present invention.

Communication circuits constituted in the camera system including the camera main unit 200, the intermediate adapter 300, and the interchangeable lens 100 will be described below with reference to FIG. 2. The camera system in this embodiment includes a notification channel CS used for transfer of signals and a data communication channel DATA used for data communication.

As described with reference to FIG. 1, the camera main unit 200 and the intermediate adapter 300 are connected through the mount 401. The mount 401 includes at least two communication terminals. The intermediate adapter 300 and the interchangeable lens 100 are connected through the mount 400. The mount 400 includes at least two communication terminals. The above-mentioned notification channel CS and data communication channel DATA are formed by the communication terminals provided in the mounts.

The notification channel CS is connected to the camera MICOM 205, the adapter MICOM 302, and the lens MICOM 111. Each MICOM can detect a signal level (voltage level) of the notification channel CS. Furthermore, the notification channel CS is pull-up connected to the power supply disposed in the camera main unit 200. The notification channel CS is connectable to a ground through a ground switch 2081 included in the camera main unit 200, and is further connectable to the ground through a ground switch 3031 included in the intermediate adapter 300. In addition, the notification channel CS is connectable to the ground through a ground switch 1121 included in the interchangeable lens 100.

With the above-described circuit configuration, the signal level of the notification channel CS can be set to Low by bringing any one of the ground switches included in the camera main unit 200, the intermediate adapter 300, and the interchangeable lens 100 into a connected state. The signal level of the notification channel CS can be set to High by bringing all of the ground switches included in the camera main unit 200, the intermediate adapter 300, and the interchangeable lens 100 into a cutoff state.

Each MICOM can change the connected state between the notification channel CS and the ground by changing the connected state of the ground switch. In other words, each MICOM can set the signal level of the notification channel CS to High or Low by changing the connected state of the ground switch. Thus, each MICOM performs transfer of a signal by changing the voltage level of the notification channel CS.

For example, the camera MICOM 205 can set the signal level of the notification channel CS to Low by bringing the ground switch 2081 included in the camera main unit 200 into the connected state. In the present invention, bringing the ground switch into the connected state is expressed by the wording "outputting Low to the notification channel CS" or "setting the notification channel CS to first setting". Furthermore, bringing the ground switch into the cutoff state is expressed by the wording "outputting High to the notification channel CS" or "setting the notification channel CS to second setting".

Thus, the signal level of the notification channel CS is set to High when all MICOMs output High to the notification channel CS. On the other hand, the signal level of the notification channel CS is set to Low when any one MICOM outputs Low to the notification channel CS. The role of the notification channel CS in data communication will be described later.

The data communication channel DATA is a two-way data communication channel capable of changing a data propagation direction. The data communication channel DATA is connected to the camera MICOM 205, the adapter MICOM 302, and the lens MICOM 111.

The data communication channel DATA is connected to the camera MICOM 205 through an input/output changeover switch 2082 included in the camera main unit 200. The camera MICOM 205 includes a data output unit for transmitting data and a data input unit for receiving data. In accordance with an operation of the input/output changeover switch 2082, the camera MICOM 205 can selectively connect the data communication channel DATA to one of the data output unit and the data input unit.

Furthermore, the data communication channel DATA is connected to the adapter MICOM 302 through an input/output changeover switch 3032 included in the intermediate adapter 300. The adapter MICOM 302 includes a data output unit for transmitting data and a data input unit for receiving data. In accordance with an operation of the input/output changeover switch 3032, the adapter MICOM 302 can selectively connect the data communication channel DATA to one of the data output unit and the data input unit.

The data communication channel DATA is connected to the lens MICOM 111 through an input/output changeover switch 1122 included in the interchangeable lens 100. The lens MICOM 111 includes a data output unit for transmitting data and a data input unit for receiving data. In accordance with an operation of the input/output changeover switch 1122, the lens MICOM 111 can selectively connect the data communication channel DATA to one of the data output unit and the data input unit. With the above-described circuit configuration, the data propagation direction in the data communication channel DATA can be appropriately switched.

Explanation of Data Format

A format of data communicated via the data communication channel DATA will be described below with reference to FIG. 3.

Figure 3:
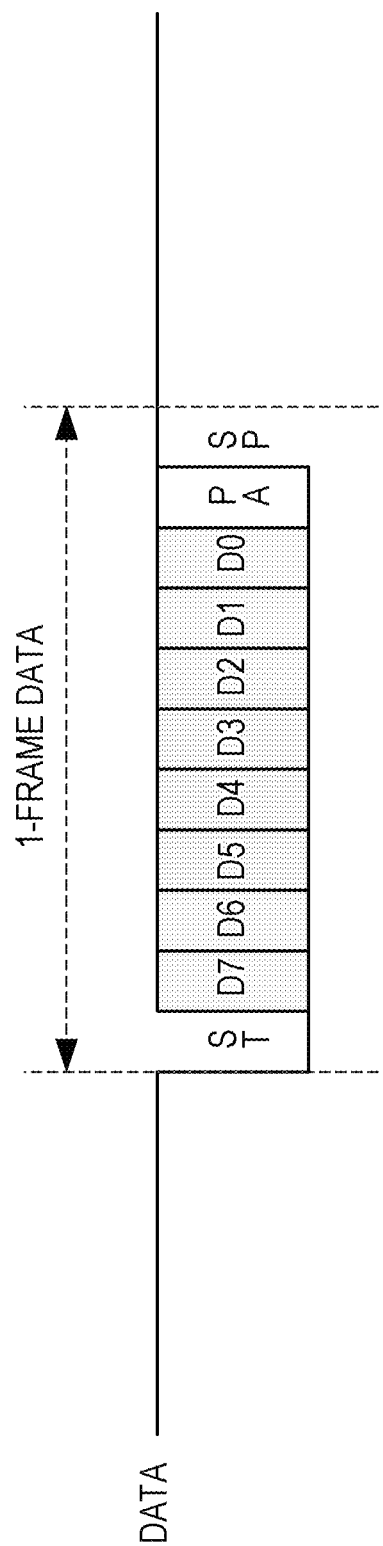
FIG. 3 illustrates a format for data transmitted and received in the present invention.

FIG. 3 illustrates a data format in a start-stop synchronization communication method of previously setting a communication speed on both the data transmitting side and the data receiving side, and performing data communication at a communication bit rate in accordance with the setting. The term "communication bit rate" implies an amount of data capable of being transferred per second, and it is expressed in bps (bit per second). FIG. 3 illustrates a signal waveform of one frame that is a minimum communication unit.

In a state in which the data communication is not performed, a signal level of the data communication channel DATA is maintained at a Hi level. Then, the signal level of the data communication channel DATA is set to Low for a 1-bit period in order to notify the start of the data transmission to the data receiving side. This 1-bit period is called a start bit ST, and a data frame begins with the start bit ST. Data of 1 byte is transmitted for an 8-bit period spanning from the second bit, which succeeds to the start bit ST, to the ninth bit.

A data bit array is in MSB (Most Significant Bit) first format that begins with the most significant data D7, followed by data D6, data D5, etc. in order, and that ends with the least significant data D0. Parity information (PA) of 1 bit is added at the tenth bit, and the signal level of the data communication channel DATA is set to High for a period of a stop bit SP that indicates the end of one frame. A data frame period beginning with the start bit ST is thereby ended. The parity information is not always required to be one bit, and parity information of multiple bits may be added. The parity information is not essential, and a format added with no parity information may also be used.

Alternatively, the data bit array may be in LSB (Least Significant Bit) first format that begins with the least significant data D0, followed by data D1, data D2, etc. in order, and ends with the most significant data D7. Although 1-byte data is transmitted for the 8-bit period in this embodiment, the 1-byte data may be transmitted for a bit period other than the 8-bit period.

Explanation of Sequence of Boot-Up Operation

A sequence of the boot-up operation in the camera system according to the present invention will be described below with reference to FIG. 4. VDD represents a channel formed by the power supply terminals. When supply of electric power from the camera main unit 200 to the intermediate adaptor 300 and the interchangeable lens 100 is started, a signal level of VDD changes from Low to High. During a period in which the power supply from the camera main unit 200 is continued, the signal level of VDD is maintained at High.

Figure 4A:
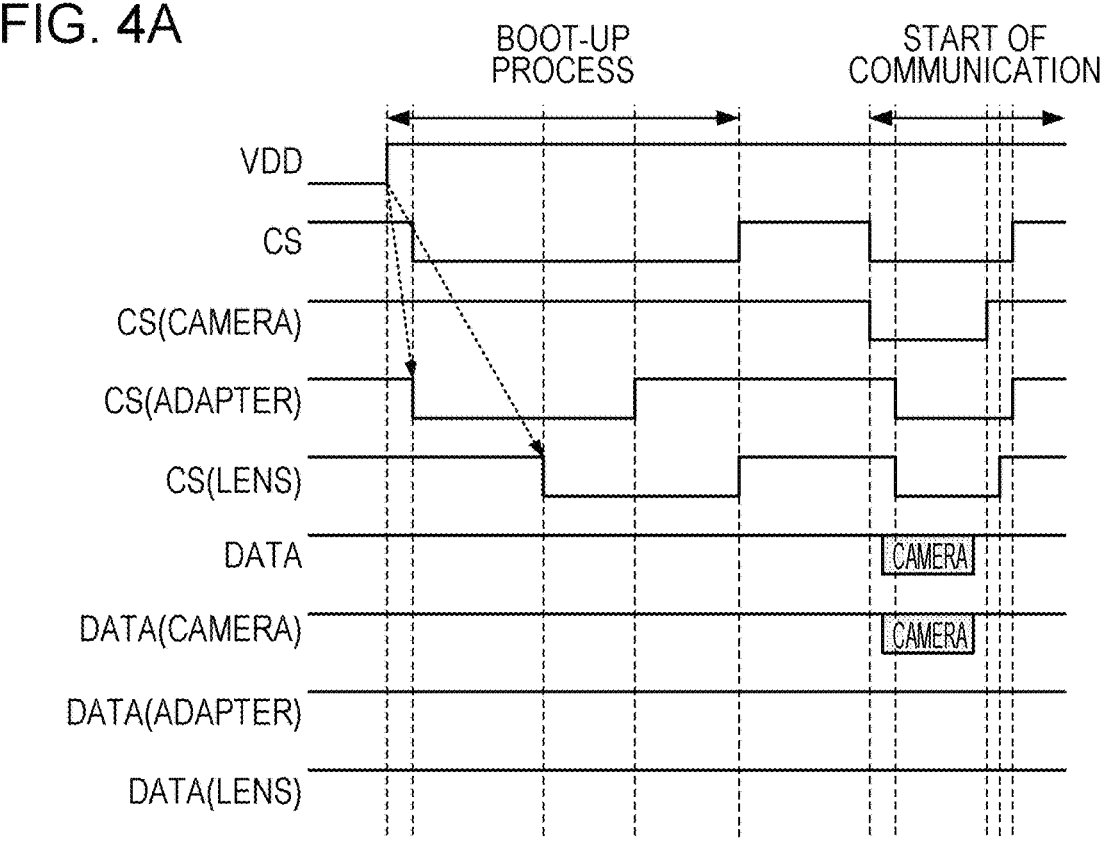
FIG. 4A is a chart illustrating a voltage level of a notification channel in a boot-up operation.

First, when the power supply from the camera main unit 200 to the intermediate adaptor 300 and the interchangeable lens 100 is started, the adapter MICOM 302 and the lens MICOM 111 output Low to the notification channel CS and start the boot-up operation. In FIG. 4A, because the adapter MICOM 302 outputs Low to the notification channel CS before the lens MICOM 111, the signal level of the notification channel CS is Low when the adapter MICOM 302 outputs Low to the notification channel CS.

Each of the adapter MICOM 302 and the lens MICOM 111 executes the boot-up operation. After the completion of the boot-up operation and the end of preparations for communicating with the camera MICOM 205, the adapter MICOM 302 and the lens MICOM 111 output High to the notification channel CS. The camera MICOM 205, i.e., the communication master, executes the boot-up operation while outputting High to the notification channel CS.

After starting the power supply to the intermediate adaptor 300 and the interchangeable lens 100, the camera MICOM 205 determines the signal level of the notification channel CS. If the signal level of the notification channel CS is determined to be in a High state, the camera MICOM 205 judges that the boot-up operations in the adapter MICOM 302 and the lens MICOM 111 have been completed. Then, the camera MICOM 205 outputs Low to the notification channel CS and starts communication with the adapter MICOM 302 and the lens MICOM 111. Outline of data communication in the camera system according to the present invention will be described later with reference to FIG. 6.

In the present invention, as described above, the timing of the start of communication is controlled by utilizing the feature that the signal level of the notification channel CS becomes High only when all the MICOMs connected to the notification channel output High to the notification channel CS. According to the present invention, since the camera MICOM 205 can recognize the completion of the boot-up operation in each accessory device by using only the notification channel CS, there is no necessity of providing a dedicated notification channel for each MICOM in the communication system.

Additionally, the camera MICOM 205 can more reliably recognize the completion of the boot-up operation in each accessory device by appropriately setting the timing of determining the signal level of the notification channel CS.

Figure 4B:
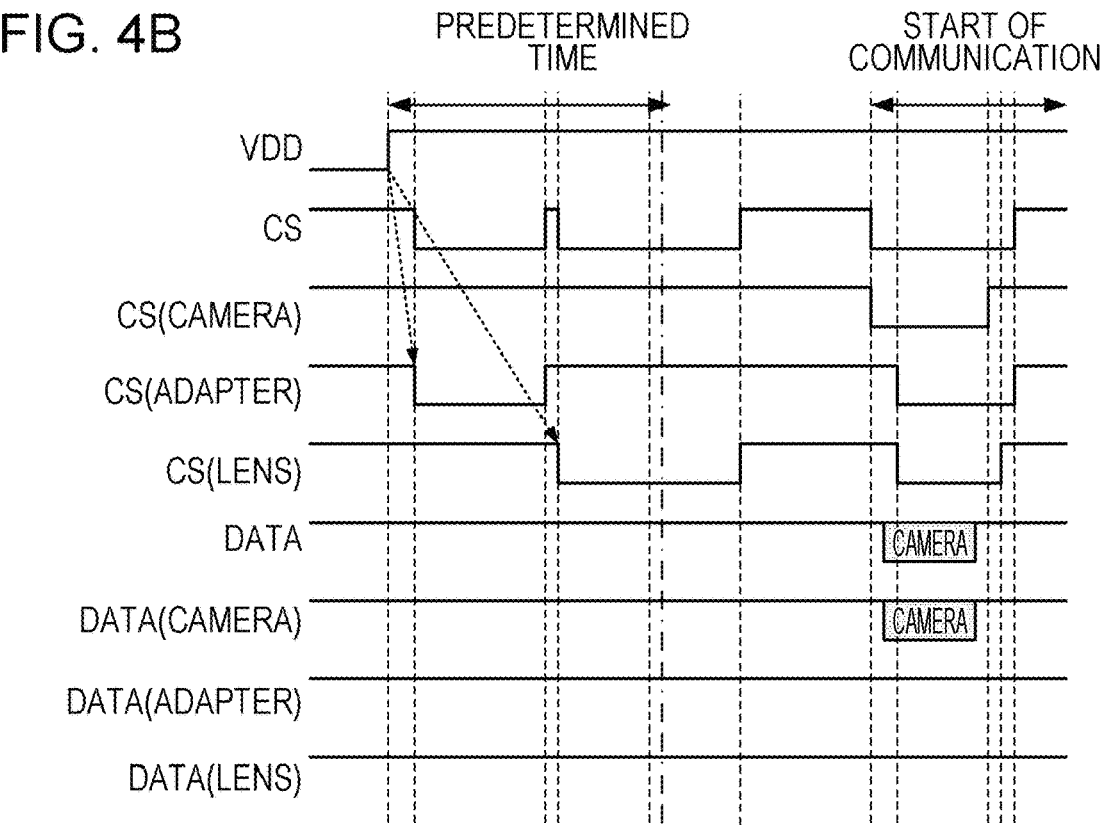
FIG. 4B is a chart illustrating a voltage level of the notification channel in the boot-up operation.

FIG. 4B represents an example in which the boot-up operation in the adapter MICOM 302 is quickly completed and the boot-up operation in the lens MICOM 111 is started after the completion of the boot-up operation in the adapter MICOM 302. As illustrated in FIG. 4B, during a period from the completion of the boot-up operation in the adapter MICOM 302 to the start of the boot-up operation in the lens MICOM 111, the signal level of the notification channel CS is High. Accordingly, when the camera MICOM 205 determines the signal level of the notification channel CS at that timing, it erroneously recognizes that the boot-up operation in the lens MICOM 111 has been completed, although the lens MICOM 111 is actually in a state before starting the boot-up operation.

Taking into consideration the above point, in FIG. 4B, the timing when the camera MICOM 205 determines the signal level of the notification channel CS is appropriately set. More specifically, the camera MICOM 205 is controlled not to determine the signal level of the notification channel CS during a period corresponding to the lapse of a predetermined time from the start of the power supply to the intermediate adaptor 300 and the interchangeable lens 100. The above-described erroneous recognition can be avoided by such setting. Here, the "predetermined time" is set so as to allow the camera MICOM 205 to determine the signal level of the notification channel CS after all the accessory devices mounted to the camera main unit 200 have set the voltage level of the notification channel CS to the first level.

While the embodiment represents an example in which the predetermined time is measured from the start of the power supply, the "predetermined time" may be measured from the timing when the signal level of the notification channel CS has changed to Low for the first time after the start of the power supply.

Explanation of Communication Flow in Boot-Up Operation

A communication flow in the boot-up operation in the camera MICOM 205 and the adapter MICOM 302 will be described below with reference to FIG. 5. The camera MICOM 205 and the adapter MICOM 302 execute communication control, illustrated in a flowchart of FIG. 5, in accordance with a communication control program that is a computer program. In FIG. 5, "S" stands for a step. FIG. 5 discloses a communication flow in the camera MICOM 205 that is the communication master, and a communication flow in the adapter MICOM 302 that is the communication slave. A communication flow in the lens MICOM 111 is substantially the same as that of the adapter MICOM 302, and hence description of the communication flow in the lens MICOM 111 is omitted here.

First, the communication flow in the camera MICOM 205 is described. In S500, whether an event for starting the power supply has occurred is determined. If the event for starting the power supply has occurred, the camera MICOM 205 goes to S501. If that event does not occur, the determination in S500 is repeated.

In S501, the power supply to the lens MICOM 111 and the adapter MICOM 302 is started, and a time elapsed from the start of the power supply in S501 is measured in S502. Then, whether the elapsed time exceeds the predetermined time is determined in S503. This determination is continuously performed until the elapsed time exceeds the predetermined time.

If the elapsed time exceeds the predetermined time, the camera MICOM 205 goes to S504 and determines whether the signal level of the notification channel CS is High. This determination is continuously performed until the signal level of the notification channel CS is determined to be High. If the signal level of the notification channel CS is determined to be High, the camera MICOM 205 goes to S505 and starts the communication with the adapter MICOM 302 and the lens MICOM 111.

Next, the communication flow in the adapter MICOM 302 is described. When the power supply from the camera main body 200 is started, the boot-up operation in the adapter MICOM 302 is started in S600. Then, the adapter MICOM 302 outputs Low to the notification channel CS in S601, thereby notifying a communication wait request to the camera MICOM 205. S601 may be executed at the same time as S600. The communication wait request is to stop the communication in the camera system, and the presence of the communication wait request is determined based on the signal level of the notification channel CS. Thus, in S601, the communication wait request is notified from the adapter MICOM 302 to the camera MICOM 205 such that data transmission from the camera MICOM 205 is not started.

Then, in S602, the adapter MICOM 302 determines whether the boot-up operation in the adapter MICOM 302 has been completed. This determination is continuously performed until the boot-up operation in the adapter MICOM 302 is completed. If the boot-up operation in the adapter MICOM 302 has been completed, the adapter MICOM 302 goes to S603 and changes the output to the notification channel CS from Low to High, thereby canceling the communication wait request to the camera MICOM 205.

Explanation of Outline of Data Communication

Outline of the data communication in the present invention will be described below with reference to FIG. 6. The data communication in the present invention is performed under conditions that the camera main unit 200 operates as a communication master and each of the intermediate adapter 300 and the interchangeable lens 100 operates as a communication slave.

Figure 6:
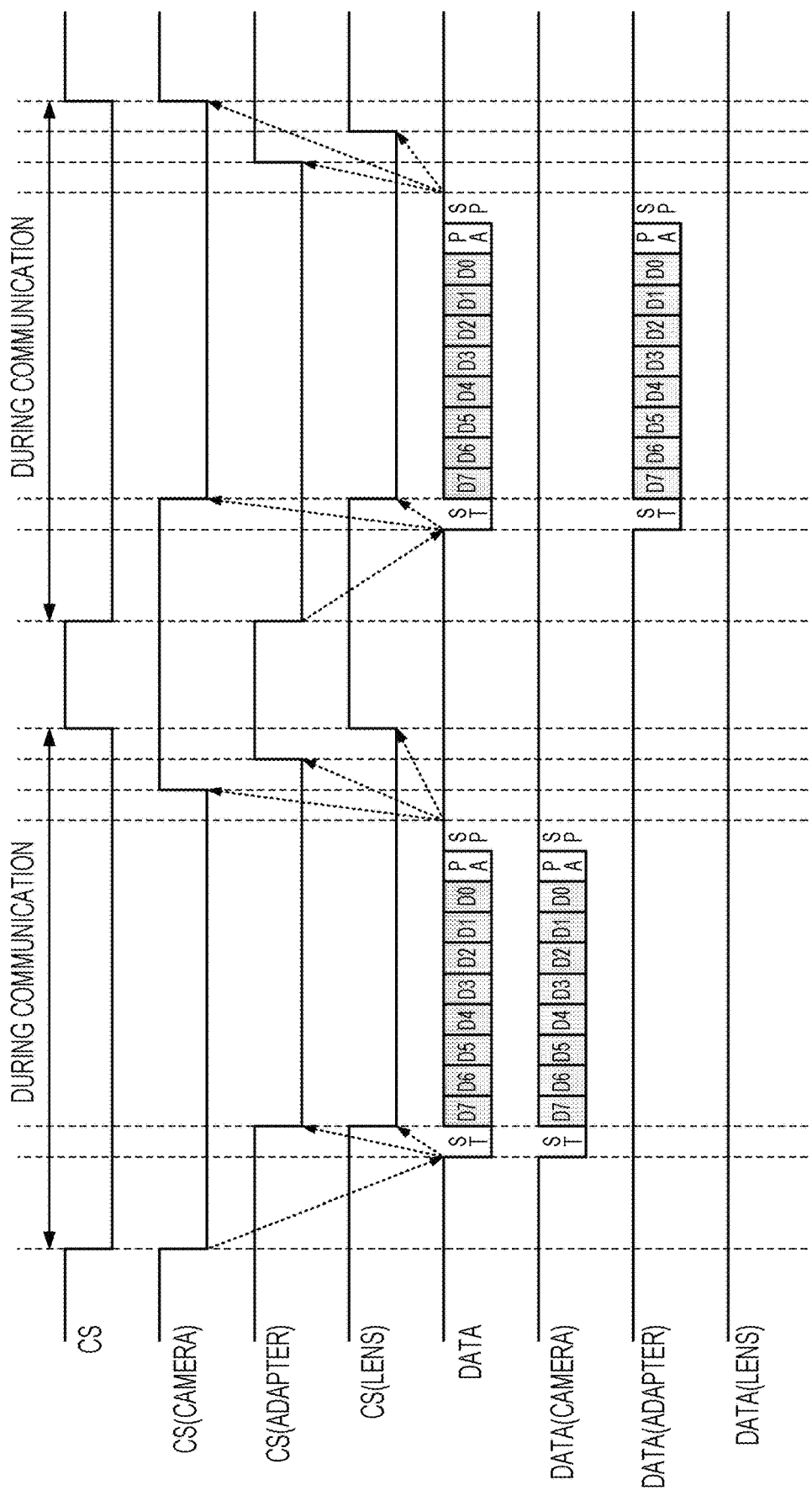
FIG. 6 is a schematic view illustrating communication waves in data communication.

FIG. 6 illustrates signal waves transferred in the data communication in the present invention. The camera MICOM 205 of the camera main unit 200, i.e., the communication master, notifies the start of the communication to the lens MICOM 111 and the adapter MICOM 302, i.e., the communication slaves, by outputting Low to the notification channel CS.

Then, the camera MICOM 205 transmits data to the lens MICOM 111 and the adapter MICOM 302 via the data communication channel DATA.

On the other hand, the lens MICOM 111 and the adapter MICOM 302 output Low to the notification channel CS in response to detection of the above-described start bit ST via the data communication channel DATA. Because the camera MICOM 205 already outputs Low at the time when the lens MICOM 111 and the adapter MICOM 302 output Low to the notification channel CS, the signal level of the notification channel CS is continuously kept Low.

The lens MICOM 111 and the adapter MICOM 302 notify the communication wait request by outputting Low to the notification channel CS.

After transmitting all data, the camera MICOM 205 outputs High to the notification channel CS. After receiving the stop bit SP transmitted via the data communication channel DATA, the lens MICOM 111 and the adapter MICOM 302 execute analysis of the received data and internal processing corresponding to the received data. Then, the lens MICOM 111 and the adapter MICOM 302 output High to the notification channel CS after the preparations for executing the next communication have finished.

When all the components constituting the camera system output High to the notification channel CS, the signal level of the notification channel CS becomes High. The camera MICOM 205, the lens MICOM 111, and the adapter MICOM 302 can confirm, based on return of the signal level of the notification channel CS to High, the fact that the components constituting the camera system have come into a state capable of executing the next communication.

In FIG. 6, the data transmitted from the camera MICOM 205 includes a transmission request command to the adapter MICOM 302, and data transmission by the adapter MICOM 302 is performed following the data transmission by the camera MICOM 205.

More specifically, after the signal level of the notification channel CS has become High, the adapter MICOM 302 outputs Low to the notification channel CS. Thus, the adapter MICOM 302 notifies the start of communication to the lens MICOM 111 and the camera MICOM 205. Then, the adapter MICOM 302 transmits data to the lens MICOM 111 and the camera MICOM 205 via the data communication channel DATA.

On the other hand, the lens MICOM 111 and the camera MICOM 205 output Low to the notification channel CS in response to detection of the above-described start bit ST via the data communication channel DATA. Because the adapter MICOM 302 already outputs Low to the notification channel CS at the time when the lens MICOM 111 and the camera MICOM 205 output Low to the notification channel CS, the signal level of the notification channel CS is continuously kept Low.

After transmitting all data, the adapter MICOM 302 outputs High to the notification channel CS. After receiving the stop bit SP transmitted via the data communication channel DATA, the lens MICOM 111 and the camera MICOM 205 execute analysis of the received data and internal processing corresponding to the received data. Then, the lens MICOM 111 and the camera MICOM 205 output High to the notification channel CS after the preparations for executing the next communication have finished.

When all the components constituting the camera system output High to the notification channel CS, the signal level of the notification channel CS becomes High. The camera MICOM 205, the lens MICOM 111, and the adapter MICOM 302 can confirm, based on return of the signal level of the notification channel CS to High, the fact that the components constituting the camera system have come into a state capable of executing the next communication.

As described above, in the data communication according to the present invention, the data transmitting side notifies the start of the communication to the data receiving side by outputting Low to the notification channel CS and changing the signal level of the notification channel CS from High to Low. The data receiving side notifies cancelation of the communication wait request to the individual components of the camera system by changing the output to the notification channel CS from Low to High.

Although FIG. 6 illustrates an example of the communication waves in the data communication in the present invention, the present invention is not limited to the illustrated example. In another example, the data transmitted or received in one data communication may be data of multiple bytes instead of 1-byte data.

Explanation of Data Communication Flow

Figure 7:
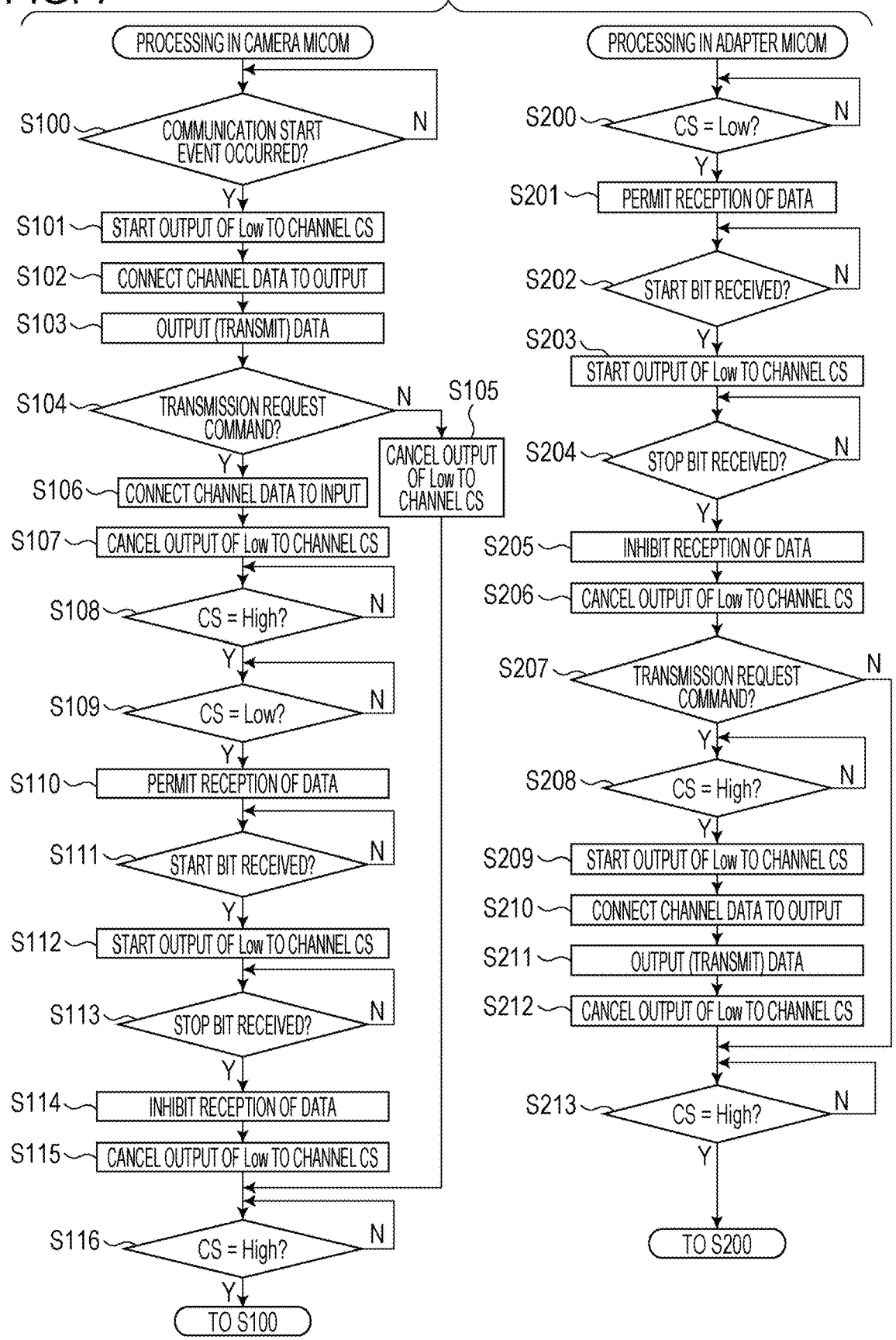
FIG. 7 is a flowchart referenced to explain a communication flow in the data communication.

A data communication flow in the present invention will be described in detail below with reference to FIG. 7. A flow from S100 to S116 on the left side in FIG. 7 represents processing executed by the camera MICOM 205. A flow from S200 to S213 on the right side in FIG. 7 represents processing executed by the adapter MICOM 302. The camera MICOM 205 and the adapter MICOM 302 execute communication control, illustrated in a flowchart of FIG. 7, in accordance with a communication control program that is a computer program. In FIG. 7, "S" stands for a step. FIG. 7 discloses a communication flow in the camera MICOM 205 that is the communication master, and a communication flow in the adapter MICOM 302 that is the communication slave. A communication flow in the lens MICOM 111 is substantially the same as that of the adapter MICOM 302, and hence description of the communication flow in the lens MICOM 111 is omitted here.

The camera MICOM 205 determines in S100 whether a communication start event has occurred. If the communication start event has occurred, the camera MICOM 205 goes to S101. If that event does not occur, the determination in S100 is repeated.

In S101, the camera MICOM 205 notifies the start of the broadcast communication to the lens MICOM 111 and the adapter MICOM 302 by outputting Low to the notification channel CS and setting the signal level of the notification channel CS to Low. Then, in S102, the camera MICOM 205 operates the input/output changeover switch 2082. The data communication channel DATA is thereby connected to the data output unit of the camera MICOM 205, and the data transmission is started in S103.

In S104, the camera MICOM 205 determines whether the transmission request command is included in the data transmitted from the camera MICOM 205 in S103. The transmission request command is a command of requesting the communication slave, which has received the data transmitted from the camera MICOM 205, i.e., the communication master, to transmit data to the camera MICOM 205.

If, in S103, the transmission request command is not included in the data transmitted from the camera MICOM 205, the camera MICOM 205 goes to S105. In S105, the output of Low to the notification channel CS is canceled after the completion of the data transmission from the camera MICOM 205. Then, the camera MICOM 205 goes to S116.

If, in S103, the transmission request command is included in the data transmitted from the camera MICOM 205, the camera MICOM 205 goes to S106. In S106, the data communication channel DATA is connected to the data input unit of the camera MICOM 205 after the completion of the data transmission from the camera MICOM 205. Then, the camera MICOM 205 goes to S107. In S107, the camera MICOM 205 cancels the output of Low to the notification channel CS and outputs High.

In S108, the camera MICOM 205 determines whether the signal level of the notification channel CS has become High. This determination is continuously performed until the signal level of the notification channel CS becomes High. When the signal level of the notification channel CS is High, this indicates that the camera system is in the state capable of performing communication. If the signal level of the notification channel CS has become High, the camera MICOM 205 then determines in S109 whether the signal level of the notification channel CS changes to Low. This determination is continuously performed until the signal level of the notification channel CS changes to Low.

In response to the change of the signal level of the notification channel CS to Low, communication from the adapter MICOM 302, i.e., the communication slave, to the camera MICOM 205 is started. After determining the change of the signal level of the notification channel CS to Low, the camera MICOM 205 permits in S110 the reception of data via the data communication channel DATA. Then, the camera MICOM 205 determines in S111 whether the start bit included in the data transmitted from the adapter MICOM 302 has been received. This determination is continuously performed until the start bit is received.

Upon receiving the start bit, the camera MICOM 205 goes to S112 and outputs Low to the notification channel CS. Then, the camera MICOM 205 determines in S113 whether the stop bit has been received. This determination is continuously performed until the stop bit is received. Upon receiving the stop bit, the camera MICOM 205 inhibits the reception of data via the data communication channel DATA and executes analysis of the received data and internal processing corresponding to the received data in S114. Then, in S115, the camera MICOM 205 cancels the output of Low to the notification channel CS and outputs High.

Then, in S116, the camera MICOM 205 determines whether the signal level of the notification channel CS has become High. This determination is continuously performed until the signal level of the notification channel CS becomes High. The state of the signal level of the notification channel CS being High represents a state in which the data transmission from the camera MICOM 205 is permitted. Accordingly, the camera MICOM 205 returns to S100 and determines whether the communication start event has occurred.

The communication flow in the adapter MICOM 302 will be described below. In S200, the adapter MICOM 302 determines whether the signal level of the notification channel CS has changed to Low. This determination is continuously performed until the signal level of the notification channel CS changes to Low. Because the data transmission from the camera MICOM 205, i.e., the communication master, is started in response to the change of the signal level of the notification channel CS to Low, the adapter MICOM 302 permits the reception of data via the data communication channel DATA in S201.

Then, the adapter MICOM 302 determines in S202 whether the start bit has been received. This determination is continuously performed until the start bit is received. Upon receiving the start bit in S202, the adapter MICOM 302 starts analysis of the received data and internal processing corresponding to the received data, and outputs Low to the notification channel CS in S203. The communication wait request is thereby notified to the components constituting the camera system.

Then, the adapter MICOM 302 determines in S204 whether the stop bit has been received. This determination is continuously performed until the stop bit is received. If the adapter MICOM 302 determines that the stop bit has been received, it inhibits the reception of data via the data communication channel DATA and continues the analysis of the received data and the internal processing corresponding to the received data in S205. When the internal processing of the data is completed and a state capable of executing the next data communication is established, the adapter MICOM 302 cancels the output of Low to the notification channel CS and outputs High in S206.

In S207, the adapter MICOM 302 determines whether the transmission request command is included in the data received from the camera MICOM 205. If the adapter MICOM 302 determines that the transmission request command is included, it goes to S208 and determines whether the signal level of the notification channel CS has become High. This determination is continuously performed until the signal level of the notification channel CS becomes High. When the signal level of the notification channel CS is High, this indicates that the camera system is in the state capable of performing communication. If the transmission request command is not included in the data received from the camera MICOM 205, the adapter MICOM 302 goes to later-described S213.

If the adapter MICOM 302 determines in S208 that the signal level of the notification channel CS is High, it goes to S209. In S209, the adapter MICOM 302 outputs Low to the notification channel CS to change the signal level of the notification channel CS to Low, thereby notifying the start of the data communication to the camera MICOM 205 and the lens MICOM 111. Then, in S210, the input/output change-over switch 3032 is operated to connect the data communication channel DATA to the data output unit of the adapter MICOM 302. The data transmission is started in S211.

Upon the completion of the data transmission, the adapter MICOM 302 cancels the output of Low to the notification channel CS and outputs High in S212. Then, in S213, the adapter MICOM 302 determines whether the signal level of the notification channel CS has become High. This determination is continuously performed until the signal level of the notification channel CS becomes High.

The state of the signal level of the notification channel CS being High represents a state in which the data transmission from the camera MICOM 205 is permitted. Accordingly, the adapter MICOM 302 returns to S200 and determines whether the signal level of the notification channel CS has changed to Low.

The above-described embodiment can be implemented by additionally using other communication channels in combination with the notification channel CS and the data communication channel DATA.

Figure 8:
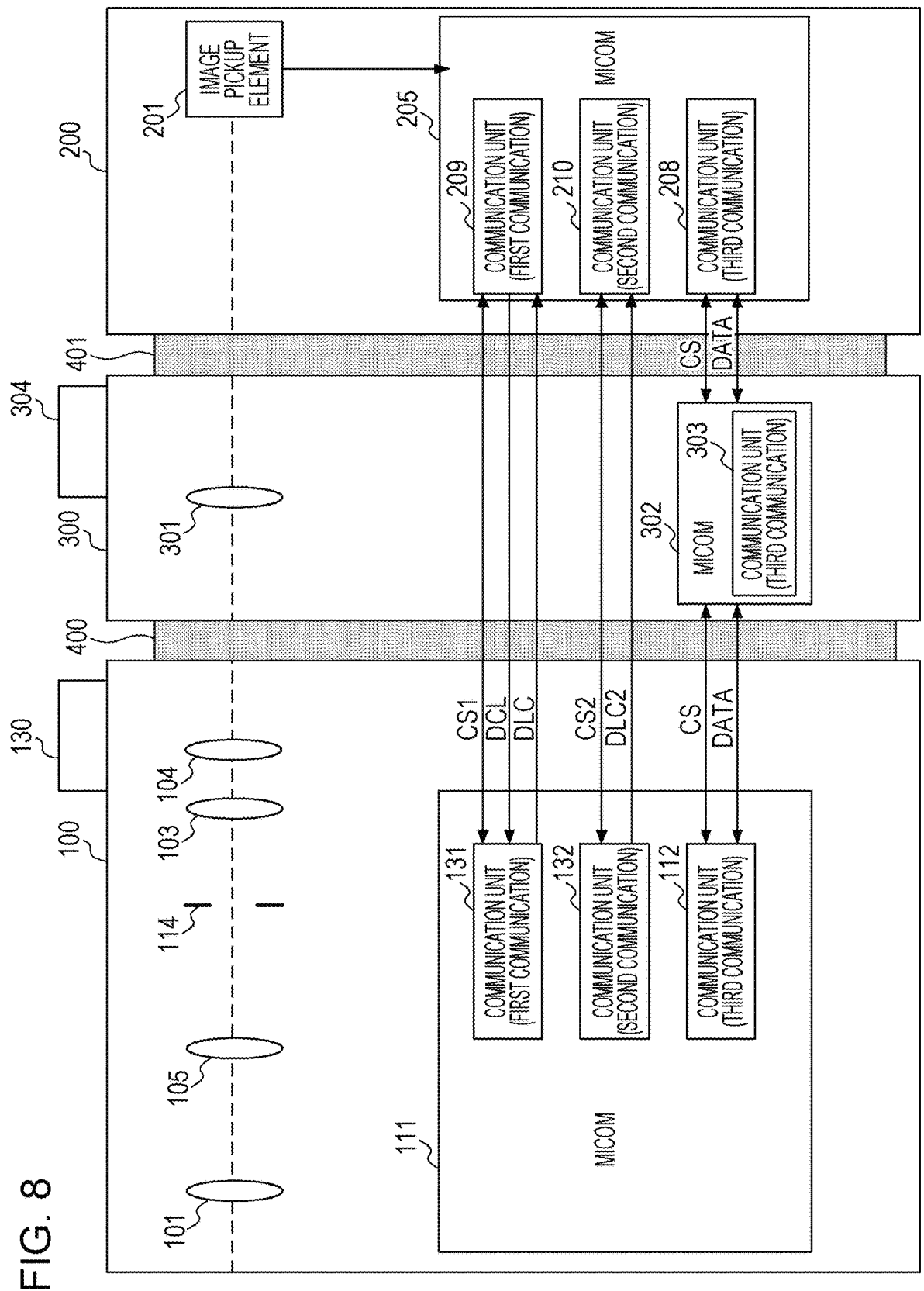
FIG. 8 is an explanatory view referenced to explain other communication channels.

An example of such a case will be described below with reference to FIG. 8. In FIG. 8, the same components as those in FIG. 1 are denoted by the same reference numerals, and duplicate description of the same components is omitted. The notification channel CS and the data communication channel DATA in the above description correspond to a communication line for communication called here third communication.

The lens MICOM 111 controls, in addition to the communication unit 112, a communication unit 131 for first communication and a communication unit 132 for second communication. The camera MICOM 205 controls, in addition to the communication unit 112, a communication unit 209 for the first communication and a communication unit 210 for the second communication.

The first communication is first described. The first communication is performed with the aid of the communication unit 131 and the communication unit 209. Via a notification channel CS1, a data communication channel DCL, and a data communication channel DLC, the communication unit 131 performs communication in accordance with an instruction from the lens MICOM 111, and the communication unit 209 performs communication in accordance with an instruction from the camera MICOM 205. The communication unit 131 and the communication unit 209 set a voltage level of the notification channel CS1, a communication rate (data amount per unit time) in start-stop synchronization communication, and a communication voltage. Furthermore, the communication unit 131 and the communication unit 209 transmit and receive data via the data communication channel DCL and the data communication channel DLC upon receiving instructions from the lens MICOM 111 and the camera MICOM 205.

The notification channel CS1 is a signal line used, for example, to notify a communication request from the camera main unit 200 to the interchangeable lens 100. The data communication channel DCL is a channel used when data is transmitted from the camera main unit 200 to the interchangeable lens 100, and the data communication channel DLC is a channel used when data is transmitted from the interchangeable lens 100 to the camera main unit 200.

In the first communication, the camera MICOM 205 and the lens MICOM 111 perform the communication according to clock synchronization communication or start-stop synchronization communication. Initial communication performed after the interchangeable lens 100 has been connected to the camera main unit 200 is also performed according to the first communication at the beginning. The camera MICOM 205 and the lens MICOM 111 communicate identification information of the interchangeable lens 100 and switch the communication mode from the clock synchronization communication to the start-stop synchronization communication if it is determined that the interchangeable lens 100 mounted to the camera main unit 200 is adaptable for the start-stop synchronization communication. From the result of the communication of the identification information, the camera MICOM 205 may determine whether the interchangeable lens 100 is adaptable for the third communication in which communication is performed with inclusion of the adapter 300 as well. If the camera MICOM 205 determines that the interchangeable lens 100 is adaptable for the third communication, it may perform authentication communication, which is to recognize the interchangeable lens 100 and the intermediate adapter 300, via P2P communication.

Next, the second communication is described. The second communication is one-way communication from the interchangeable lens 100 to the camera main unit 200. The second communication is performed with the aid of the communication unit 132 and the communication unit 210. Via a notification channel CS2 and a data communication channel DLC2, the communication unit 132 performs the communication in accordance with an instruction from the lens MICOM 111, and the communication unit 210 performs the communication in accordance with an instruction from the camera MICOM 205. The camera communication unit 208 and the lens communication unit 118 transmit and receive data according to the clock synchronization communication or the start-stop synchronization communication. By using not only the data communication channel DLC for the first communication, but also the data communication channel DLC2 for the second communication channel, a large amount of data can be transmitted from the interchangeable lens 100 to the camera main unit 200 in a short time.

The above-described embodiment is merely a typical example, and various modifications or alterations can be made on the embodiment when the present invention is practically implemented. For instance, while the above-described embodiment represents an example in which the interchangeable lens and the intermediate adapter are used as the accessory devices, an interchangeable lens directly mounted to the camera main unit, a strobe directly mounted to the camera main unit, etc. may also be used as the accessory devices.

According to the present invention, the camera and the accessory device are obtained which can execute in a short time the boot-up operation for an image pickup system including the camera and all of the multiple accessory devices mounted to the camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A camera to which a plurality of accessory devices is mountable, the camera comprising:
   a camera control unit configured to control communication that is performed between the camera and all accessory devices mounted to the camera via channels, wherein the channels include a notification channel to be used for signal transfer and a data communication channel to be used for data communication; and
   a power supply unit configured to supply electric power to all the accessory devices mounted to the camera,
   wherein all the accessory devices mounted to the camera and the camera are each able to set the notification channel to a first setting and a second setting,
   wherein a voltage level of the notification channel takes a first voltage level and a second voltage level that is different from the first voltage level,
   wherein the first voltage level corresponds to the first setting when any of all the accessory devices mounted to the camera and the camera sets the notification channel to the first setting,
   wherein the second voltage level corresponds to the second setting when each of all the accessory devices mounted to the camera and the camera sets the notification channel to the second setting,
   wherein each of all the accessory devices mounted to the camera sets the notification channel to the first setting in response to start of power supply from the power supply unit such that the data communication from the camera via the data communication channel is not started, and
   wherein the camera control unit starts the data communication via the data communication channel with all the accessory devices mounted to the camera on condition that the voltage level of the notification channel takes the second voltage level in a state in which the camera control unit sets the notification channel to the second setting.

2. The camera according to claim 1, wherein, after lapse of a predetermined time from the start of the power supply from the power supply unit, the camera control unit determines whether the voltage level of the notification channel has changed to the second voltage level.

3. The camera according to claim 1, wherein, after lapse of a predetermined time from timing when a signal level of the notification channel has changed to the first voltage level for a first time after the start of the power supply from the power supply unit, the camera control unit determines whether the voltage level of the notification channel has changed to the second voltage level.

4. The camera according to claim 2, wherein the predetermined time is set such that, after all the accessory devices mounted to the camera have set the voltage level of the notification channel to the first setting, the camera control unit is permitted to determine whether the voltage level of the notification channel has changed to the second voltage level.

5. An accessory device configured to be mountable to the camera according to claim 1 and to be operated with electric power supplied from the camera, the accessory device comprising:
an accessory control unit configured to control communication performed with the camera via the notification channel and the data communication channel,
wherein the accessory control unit sets the notification channel to the first setting in response to the start of power supply from the camera, and starts preparation operation for communication with the camera, and
wherein the accessory control unit sets the notification channel to the second setting in response to end of the preparation operation.

6. The accessory device according to claim 5, wherein the accessory control unit is configured to set the notification channel to the first setting such that the data communication from the camera via the data communication channel is not started.

7. A non-transitory computer readable storage medium storing a program to cause a computer to perform a method for a camera to which a plurality of accessory devices is mountable, wherein the camera includes a camera control unit configured to control communication that is performed between the camera and all accessory devices mounted to the camera via channels, wherein the channels include a notification channel to be used for signal transfer and a data communication channel to be used for data communication, the method comprising:
supplying electric power to all the accessory devices mounted to the camera,
wherein all the accessory devices mounted to the camera and the camera are each able to set the notification channel to a first setting and a second setting,
wherein a voltage level of the notification channel takes a first voltage level and a second voltage level that is different from the first voltage level,
wherein the first voltage level corresponds to the first setting when any of all the accessory devices mounted to the camera and the camera sets the notification channel to the first setting,
wherein the second voltage level corresponds to the second setting when each of all the accessory devices mounted to the camera and the camera sets the notification channel to the second setting,
setting, via each of all the accessory devices mounted to the camera, the notification channel to the first setting in response to start of power supply from the power supply unit such that the data communication from the camera via the data communication channel is not started, and
starting, via the camera control unit, the data communication via the data communication channel with all the accessory devices mounted to the camera on condition that the voltage level of the notification channel takes the second voltage level in a state in which the camera control unit sets the notification channel to the second setting.

8. A method for a camera to which a plurality of accessory devices is mountable, wherein the camera includes a camera control unit configured to control communication that is performed between the camera and all accessory devices mounted to the camera via channels, wherein the channels include a notification channel to be used for signal transfer and a data communication channel to be used for data communication, the method comprising:
supplying electric power to all the accessory devices mounted to the camera,
wherein all the accessory devices mounted to the camera and the camera are each able to set the notification channel to a first setting and a second setting,
wherein a voltage level of the notification channel takes a first voltage level and a second voltage level that is different from the first voltage level,
wherein the first voltage level corresponds to the first setting when any of all the accessory devices mounted to the camera and the camera sets the notification channel to the first setting,
wherein the second voltage level corresponds to the second setting when each of all the accessory devices mounted to the camera and the camera sets the notification channel to the second setting,
setting, via each of all the accessory devices mounted to the camera, the notification channel to the first setting in response to start of power supply from the power supply unit such that the data communication from the camera via the data communication channel is not started, and
starting, via the camera control unit, the data communication via the data communication channel with all the accessory devices mounted to the camera on condition that the voltage level of the notification channel takes the second voltage level in a state in which the camera control unit sets the notification channel to the second setting.

9. A camera to which a plurality of accessory devices is mountable, the camera comprising:
a camera control unit configured to control communication that is performed between the camera and all accessory devices mounted to the camera via channels, wherein the channels include a notification channel to be used for signal transfer and a data communication channel to be used for data communication; and
a power supply unit configured to supply electric power to all the accessory devices mounted to the camera,
wherein all the accessory devices mounted to the camera and the camera are each able to set the notification channel to a first setting and a second setting,
wherein a voltage level of the notification channel takes a first voltage level and a second voltage level that is different from the first voltage level, wherein the first voltage level corresponds to the first setting when any of all the accessory devices mounted to the camera and the camera sets the notification channel to the first setting, wherein the second voltage level corresponds to the second setting when each of all the accessory devices mounted to the camera and the camera sets the notification channel to the second setting, and wherein the camera control unit starts the data communication via the data communication channel with all the accessory devices mounted to the camera on condition that the voltage level of the notification channel takes the second voltage level in a state in which the camera control unit sets the notification channel to the second setting after the power supply unit starts to supply electric power to all the accessory devices mounted to the camera.

10. An accessory device configured to be mountable to a camera and to be operated with electric power supplied from the camera, the accessory device comprising:

an accessory control unit configured to control communication performed with the camera via a notification channel to be used for signal transfer and a data communication channel to be used for data communication, wherein all accessory devices mounted to the camera and the camera are each able to set the notification channel to a first setting and a second setting, wherein a voltage level of the notification channel takes a first voltage level and a second voltage level that is different from the first voltage level, wherein the first voltage level corresponds to the first setting when any of all the accessory devices mounted to the camera and the camera sets the notification channel to the first setting, and wherein the second voltage level corresponds to the second setting when each of all the accessory devices mounted to the camera and the camera sets the notification channel to the second setting, wherein the accessory control unit sets the notification channel to the first setting in response to the start of the power supply from the camera, and starts preparation operation for communication with the camera, and wherein the accessory control unit sets the notification channel to the second setting in response to end of the preparation operation.

* * * * *